(12) United States Patent
Jacob

(10) Patent No.: US 7,975,962 B2
(45) Date of Patent: Jul. 12, 2011

(54) TRANSPORTATION VEHICLE PASSENGER ACCOMMODATION ASSEMBLY

(76) Inventor: Emil Jacob, Cambridge, MA (US)

( * ) Notice: Subject to any disclaimer, the term of this patent is extended or adjusted under 35 U.S.C. 154(b) by 777 days.

(21) Appl. No.: 11/962,076

(22) Filed: Dec. 20, 2007

(65) Prior Publication Data

US 2009/0066121 A1   Mar. 12, 2009

Related U.S. Application Data

(60) Provisional application No. 60/993,251, filed on Sep. 11, 2007, provisional application No. 60/991,238, filed on Nov. 30, 2007.

(51) Int. Cl.
*B64D 11/06* (2006.01)

(52) U.S. Cl. .................. 244/118.6; 244/122 R

(58) Field of Classification Search ............... 244/118.6, 244/118.5, 118.2, 118.1, 120, 122 R; 105/315, 105/344, 345, 322, 316; 114/189, 194
See application file for complete search history.

(56) References Cited

U.S. PATENT DOCUMENTS

| | | |
|---|---|---|
| 2,600,706 A | 6/1952 | Tully et al. |
| 5,425,516 A | 6/1995 | Daines |
| 5,716,026 A * | 2/1998 | Pascasio et al. ............ 244/118.6 |
| 5,740,989 A | 4/1998 | Daines |
| 6,237,872 B1 | 5/2001 | Bar-Levav |
| 6,851,134 B2 * | 2/2005 | Freller ............................. 5/9.1 |
| 7,077,360 B2 | 7/2006 | Jacob |
| 2005/0077761 A1 * | 4/2005 | Dryburgh et al. ............... 297/68 |
| 2006/0060703 A1 * | 3/2006 | Luk ............................ 244/118.5 |
| 2006/0192050 A1 * | 8/2006 | Cheung et al. ............. 244/118.6 |

FOREIGN PATENT DOCUMENTS

WO     WO 2005014395 A1 *   2/2005

* cited by examiner

*Primary Examiner* — Tien Dinh
*Assistant Examiner* — Richard R Green
(74) *Attorney, Agent, or Firm* — John J. Brooks, III; John Brooks Law LLC

(57) ABSTRACT

A passenger accommodation assembly for a transportation vehicle, comprising a plurality of accommodation units placed along an aisle with each accommodation unit being convertible between an upright seat position and a reclined position. A first accommodation unit of the assembly is elevated relative to a second unit whereby the legs of a passenger reclining in the second unit can extend under a seat portion of the first unit and the backrest of the passenger in the first unit can extend over the legs of the passenger in the second unit. Other embodiments of the invention comprise multiple accommodation units and combinations of accommodation unit assemblies.

8 Claims, 17 Drawing Sheets

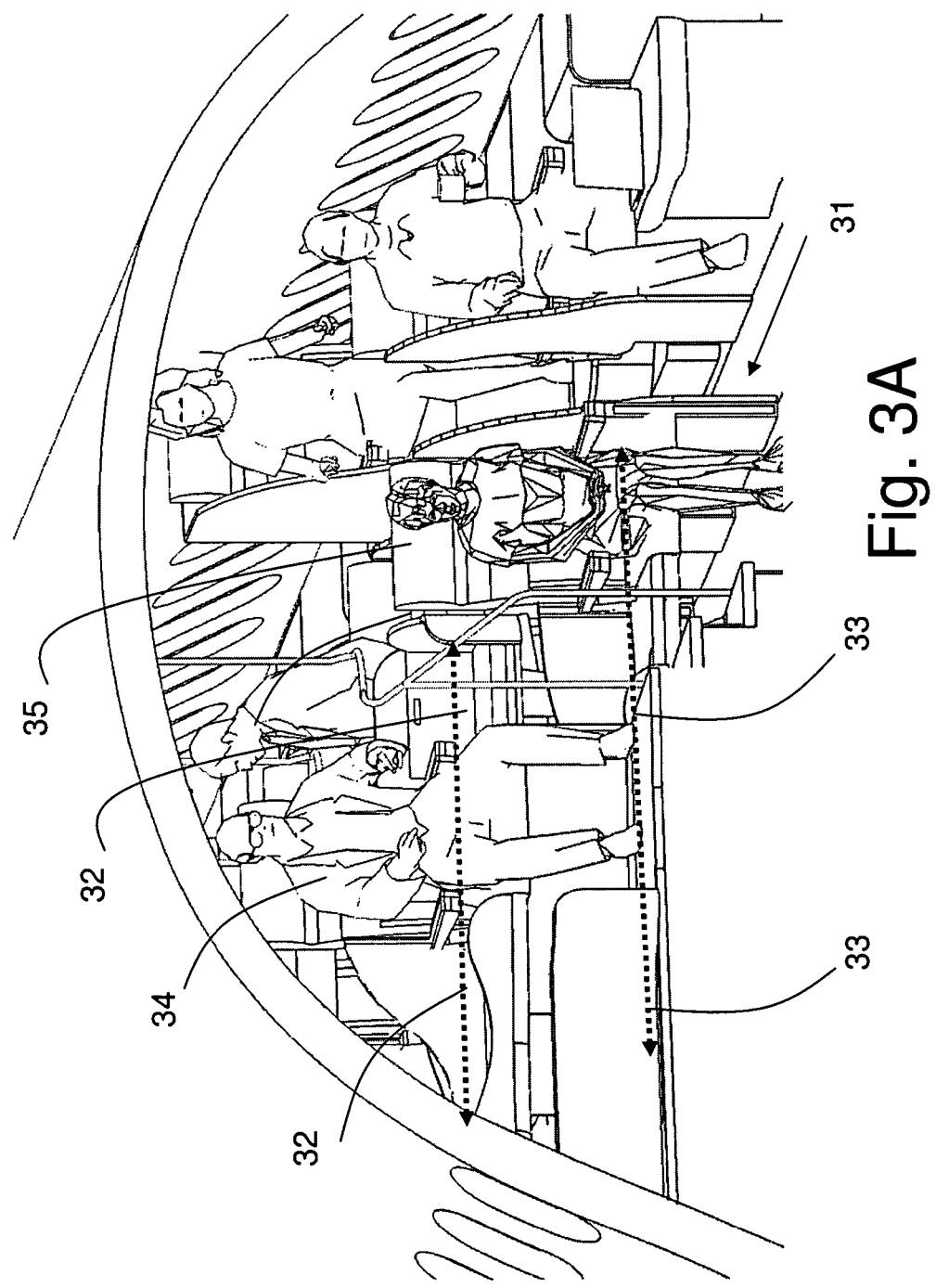

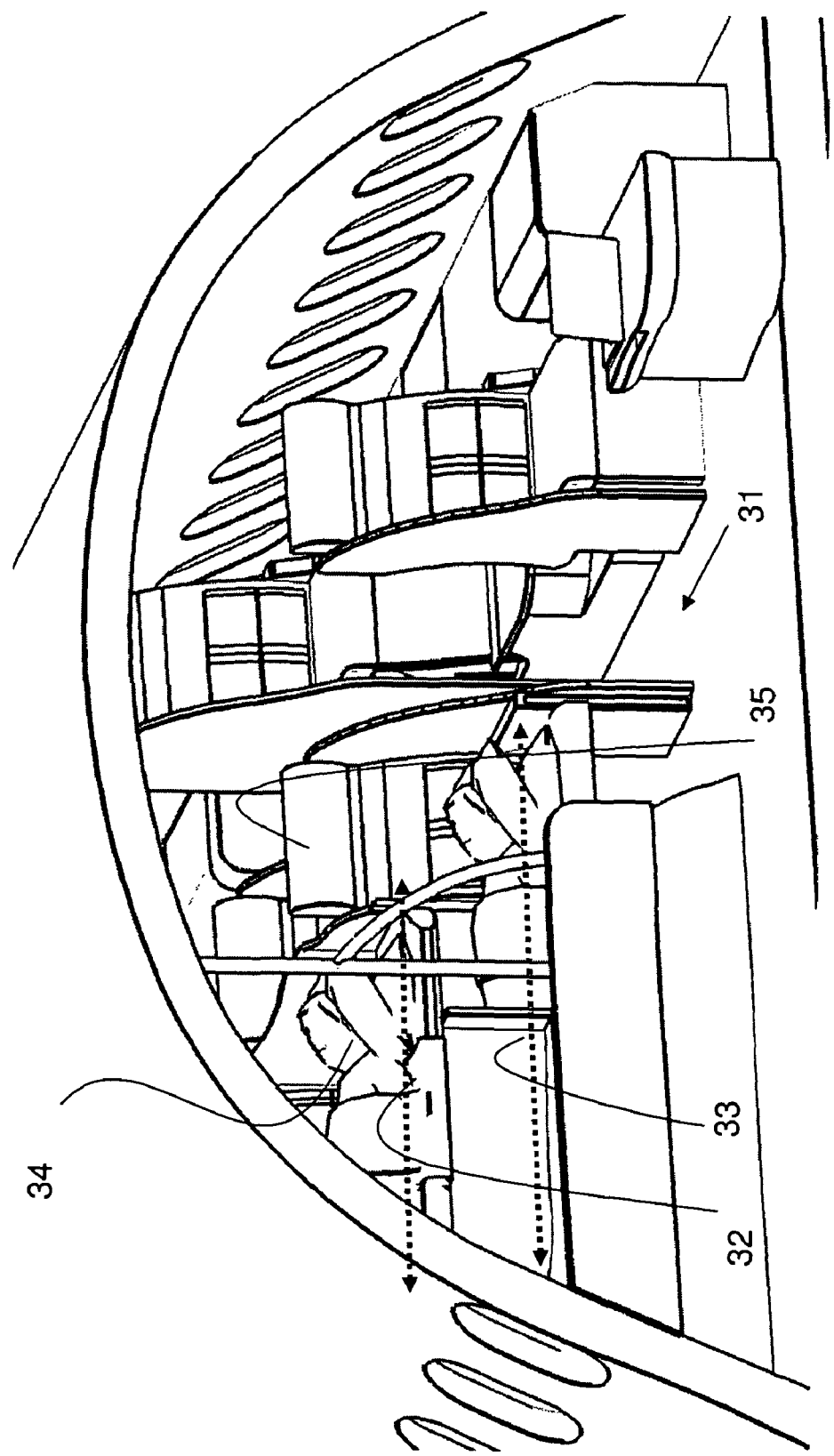

TRANSPORTATION VEHICLE PASSENGER ACCOMMODATION ASSEMBLY

CROSS-REFERENCE TO RELATED APPLICATIONS

This patent application claims benefit of U.S. Provisional Patent Application No. 60/993,251 filed on 11 Sep. 2007 and U.S. Provisional Patent Application No. 60/991,238 filed on 30 Nov. 2007 the entire contents of both applications are incorporated herein by reference.

STATEMENT REGARDING FEDERALLY SPONSORED RESEARCH OR DEVELOPMENT

Not Applicable.

NAMES OF PARTIES TO JOINT RESEARCH AGREEMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

The present invention relates to seat and bed assemblies suitable for passenger transportation vehicles, and more particularly to improved seat and bed units and layouts to enable an increased number of beds and seats in a predetermined floor space area within a transportation vehicle, such as an airplane.

2. Background of the Invention

It is desirable for the passenger transportation industry in many instances to effectively and efficiently provide comfortable seating and bedding arrangements for passengers. For example, many commercial airlines are presently providing more generous seating arrangements, and even beds, for passengers, often on lengthier flights.

Somewhat in conflict with passenger comfort is the additional desire for the transportation industry to optimize the number of passengers accommodated in a given vehicle. For example, oftentimes, passengers who desire to sleep during commercial airplane flights are forced to do so in positions that are either substantially upright, or at various angles of repose short of horizontal. This is because the seats that are provided by the commercial airline are primarily seats instead of beds, and the offer minimal reclining capabilities. However, the provision of seats instead of beds enables the commercial airline to take on more passengers for a given flight.

Accordingly, the transportation industry continues to seek solutions that can benefit the industry by providing seats and beds having greater comfort for passengers, while doing so in a manner that increases the number of passengers that were previously able to be accommodated in a given space for such types of passenger accommodations.

SUMMARY OF THE INVENTION

It is an object of one embodiment of the invention to provide a passenger seating solution with seats and beds having greater comfort for passengers, while also increasing the number of passengers that can be accommodated in a given transportation vehicle space.

It is an object of one embodiment of the invention to provide a passenger accommodation assembly for a transportation vehicle, comprising a plurality of accommodation units placed along an aisle, each accommodation unit of the plurality of accommodation units being convertible between an upright seat position and a reclined position and having a backrest portion, a seat portion, and a leg rest portion; wherein a seat portion of a first accommodation unit of the plurality of accommodation units is disposed at a first elevation magnitude relative to a floor of the transportation vehicle and a seat portion of a second accommodation unit of the plurality of accommodation units is disposed at a second elevation magnitude relative to the floor of the transportation vehicle that is less than the first elevation magnitude; and wherein a leg rest portion of the second accommodation unit extends under the first accommodation unit when the second accommodation unit is in the reclined position.

It is an object of one embodiment of the invention to provide a passenger accommodation assembly for a transportation vehicle wherein the first accommodation unit further comprises a platform portion having a platform surface, a surface front edge being furthest from the seat portion of the first accommodation unit, a surface back edge being closest to the seat portion of the first accommodation unit and a platform surface elevation magnitude from the floor of the transportation vehicle; the platform portion further comprising a recessed platform portion forming a step portion comprising a step surface and a step surface elevation magnitude from the floor of the transportation vehicle; the step surface elevation magnitude is less than the platform surface elevation magnitude; and the step surface being aligned with the surface front edge and located on a side of the platform surface accessible by the aisle whereby the step surface can be used as a step by a passenger in the aisle.

It is an object of one embodiment of the invention to provide a passenger accommodation assembly for a transportation vehicle wherein the second accommodation unit further comprises a sliding means whereby the seat portion, the backrest portion and the leg rest portion of the second accommodation is convertible between an upright seat position and a reclined position.

It is an object of one embodiment of the invention to provide a passenger accommodation assembly for a transportation vehicle wherein the second accommodation unit further comprises a leg rest surface wherein the leg rest portion of the second accommodation unit cooperates with the leg rest surface forming an extended leg rest portion under the seat portion of the first accommodation unit when the second accommodation unit is in the reclined position.

It is an object of one embodiment of the invention to provide a passenger accommodation assembly for a transportation vehicle of claim 1 further comprising a plurality of bed accommodation units placed along the aisle, each bed accommodation unit of the plurality of bed accommodation units comprising a bed backrest portion, a bed seat portion and a bed portion, the bed portion including a substantially flat surface adapted to accommodate a passenger in the recumbent position; wherein a pair of bed accommodation units of the plurality of bed accommodation units maintain a bed portion that extends perpendicular to the direction the passenger faces when seated in the bed seat portion; the pair of bed accommodation units comprising a first bed accommodation unit and a second bed accommodation unit; wherein a bed seat portion and a bed portion of the first bed accommodation unit of the plurality of bed accommodation units is disposed at a first bed elevation magnitude relative to a floor of the transportation vehicle and a bed seat portion and a bed portion of the second bed accommodation unit of the plurality of bed accommodation units is disposed at a second bed elevation magnitude relative to the floor of the transportation vehicle that is less than the first bed elevation magnitude; and wherein a bed portion of the second bed accommodation unit extends under the bed seat portion and the bed portion of the first accommodation unit.

It is an object of one embodiment of the invention to provide a passenger accommodation assembly for a transportation vehicle comprising a plurality of accommodation units placed along an aisle, each accommodation unit of the plurality of accommodation units being convertible between an upright seat position and a reclined position and having a backrest portion, a seat portion, and a leg rest portion; wherein a seat portion of an at least one first accommodation unit of the plurality of accommodation units is disposed at a first elevation magnitude relative to a floor of the transportation vehicle and a seat portion of an at least one second accommodation unit of the plurality of accommodation units is disposed at a second elevation magnitude relative to the floor of the transportation vehicle that is less than the first elevation magnitude; the at least one first accommodation unit further having a platform portion; at least one working surface portion adjacent to the at least one first accommodation unit; a bottom portion under the at least one working surface and the at least one first accommodation unit; wherein a quantity of seat portions of the at least one second accommodation unit comprises a quantity of at least one more than a quantity of seat portions of the at least one first accommodation unit; and wherein a leg rest portion of the at least one second accommodation unit extends under the bottom portion when the at least one second accommodation unit is in the reclined position.

It is an object of one embodiment of the invention to provide a passenger accommodation assembly for a transportation vehicle wherein the at least one recessed platform portion comprises a first step portion and a second step portion; the first step portion having a first step surface with a first step surface front edge, a first step surface opposing edge and a first step surface elevation magnitude from the floor of the transportation vehicle less than the platform surface elevation magnitude; the second step portion having a second step surface and a second step surface elevation magnitude from the floor of the transportation vehicle less than the platform surface elevation magnitude and greater than the first step surface elevation magnitude; the first step surface front edge being aligned with the platform surface front edge; and the first step surface opposing edge being aligned with an edge of the second step surface whereby the first step surface and the second step surface is accessible by the aisle and can be used as steps by a passenger in the aisle.

It is an object of one embodiment of the invention to provide a passenger accommodation assembly for a transportation vehicle further comprising a folding means whereby the seat portion of the second accommodation unit is can pivot upwardly whereby a passenger can stand on a surface of the floor under the seat portion of the second accommodation unit.

It is an object of one embodiment of the invention to provide a passenger accommodation assembly for a transportation vehicle wherein the seat portion and the backrest portion of the second accommodation unit further comprises a sliding means whereby the second accommodation unit can convert between an upright position and a reclined position.

It is an object of one embodiment of the invention to provide a passenger accommodation assembly for a transportation vehicle wherein the first accommodation unit further comprises a storage compartment under the seat portion and the armrest portion and the storage compartment being accessible from behind the first accommodation unit.

It is an object of one embodiment of the invention to provide a passenger accommodation assembly for a transportation vehicle wherein the storage compartment further comprises a storage compartment opening, a door and a planar opening means; and the planar opening means permits the door to be moved from the storage compartment opening whereby the door minimally interferes with a passenger in the second accommodation unit.

It is an object of one embodiment of the invention to provide a passenger accommodation assembly for a transportation vehicle further comprising at least one working surface between the first accommodation unit and the aisle.

It is an object of one embodiment of the invention to provide a method for accommodating passengers in a transportation vehicle comprising the steps of providing a plurality of accommodation units placed along an aisle, each accommodation unit of the plurality of accommodation units being convertible between an upright seat position and a reclined position and having a backrest portion, a seat portion, and a leg rest portion; providing and locating the plurality of accommodation units whereby a seat portion of a first accommodation unit of the plurality of accommodation units is disposed at a first elevation magnitude relative to a floor of the transportation vehicle and a seat portion of a second accommodation unit of the plurality of accommodation units is disposed at a second elevation magnitude relative to the floor of the transportation vehicle that is less than the first elevation magnitude; providing a leg rest surface with the second accommodation unit wherein a leg rest portion of the second accommodation unit cooperates with the leg rest surface and forms an extended leg rest portion under the seat portion of the first accommodation unit when the second accommodation unit is in the reclined position; and providing a platform portion with the first accommodation unit whereby a first passenger can access and utilize the first accommodation unit in the upright seat position and the reclined position and a second passenger can access and utilize the second accommodation unit in the upright seat position and the reclined position.

BRIEF DESCRIPTION OF THE DRAWINGS

The present invention will become better understood with reference to the following description and accompanying drawings, wherein:

FIG. 3A is a front perspective view of multiple accommodation unit assemblies in an airplane according to one embodiment of the invention that includes bed accommodation units;

FIG. 3B is another front perspective view of multiple accommodation unit assemblies in an airplane according to one embodiment of the invention that includes bed accommodation units;

DETAILED DESCRIPTION

Figure 1A:
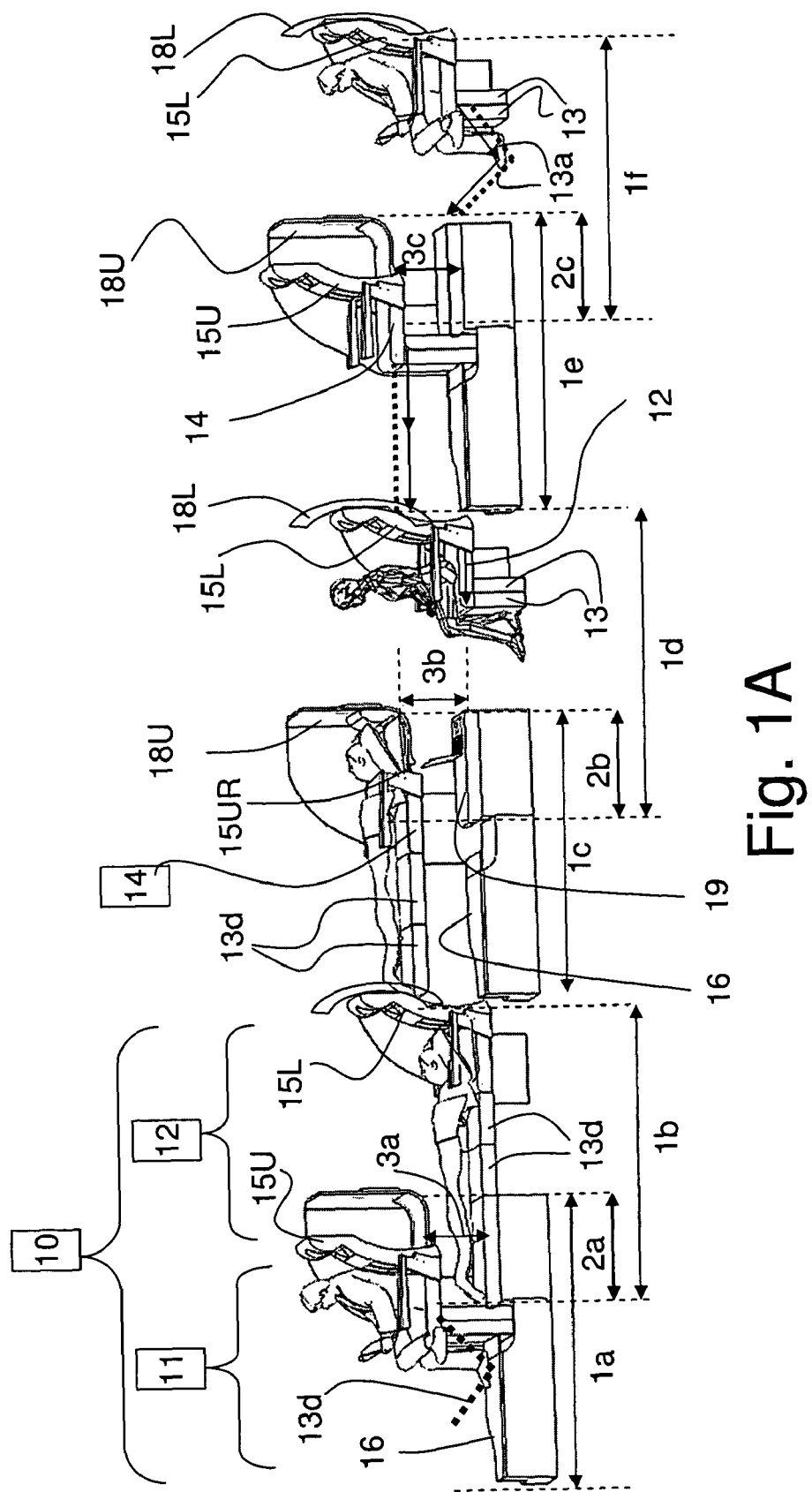
FIG. 1A is a side view of multiple accommodation unit assemblies in an airplane according to one embodiment of the invention capable of full reclining.

Illustrative embodiments of the present invention relate to provision of passenger accommodation assemblies arranged to maximize the comfort of passengers by providing the choice of both sitting and fully reposed sleeping positions as well as partially reclined positions. The assemblies and arrangements additionally optimize passenger revenues per unit of available space. The passenger accommodation assemblies take advantage of vertical space by partially overlapping or stacking each passenger's accommodation unit relative to adjacent or proximal units. In addition, the orientation of one unit relative to another can likewise be altered to increase a number of accommodation units in a given floor space area. In the multiple embodiments illustrated, overlapping accommodation units are configured with a first unit being at a raised elevation about shoulder height of a passenger in a second unit, providing an offset that reduces the space requirements for both units relative to conventional seating configurations.

The passenger accommodation assemblies of the present invention can be utilized in transportation vehicles such as, but not limited to aircraft, trains, busses and the like. In addition, the passenger accommodation assemblies enable passengers to convert from a sitting position to a fully reposed, or recumbent sleeping position. The accommodation assembly is also able to convert to a partially reclined position.

Throughout this description, the passenger accommodation units and assemblies are also referred to as units, seats, beds, seats/beds, upper units, lower units and bed units because of their position and their general ability to be converted into either a seat or a bed position.

FIGS. 1 through 12 illustrate example embodiments of accommodation assembly configurations according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, elevations, orientations or type of elements or materials, in a manner still in keeping with the spirit and scope of the present invention For purposes of illustration and efficiency, the passenger accommodation units of the present invention will be described below in terms of its incorporation into an aircraft, such as a commercial airline as seats and beds. However, it should be noted that the passenger accommodation units of the present invention are by no means limited to use on aircraft. Instead, as would be understood by those of ordinary skill in the art, the passenger accommodation units of the present invention can be utilized in any transportation vehicle of sufficient size to accommodate a plurality of passengers, including but not limited to airplanes, buses, trains, boats, trucks, and the like.

Figure 1B:
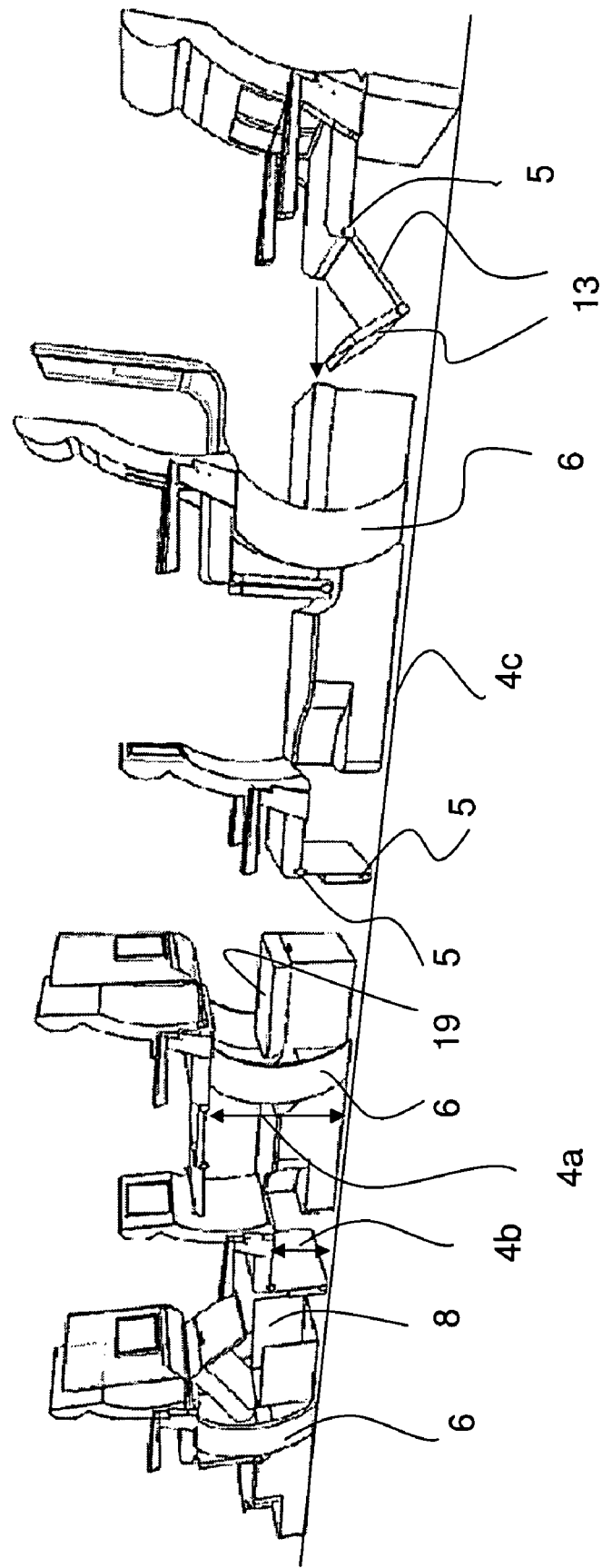
FIG. 1B is a perspective side-rear view of multiple accommodation unit assemblies in an airplane, according to one embodiment of the invention capable of full reclining.
Figure 2:
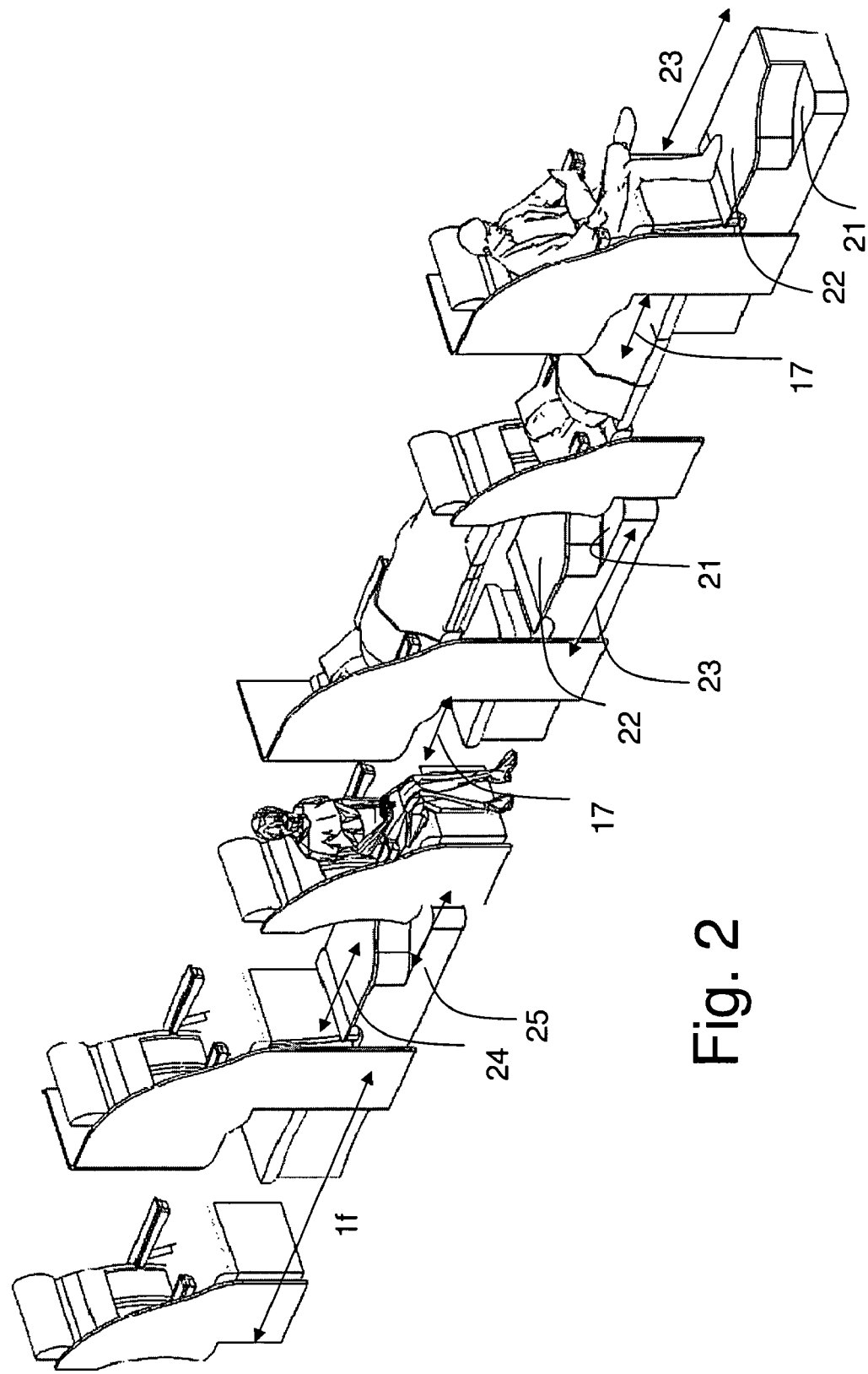
FIG. 2 is a perspective side-front view of multiple accommodation unit assemblies in an airplane according to one embodiment of the invention capable of full reclining.

The Passenger Accommodation Assembly:

Referring to FIGS. 1A, 1B and 2, an explanation of the passenger accommodation units of the present invention will be described as configured in a passenger accommodation assembly. Other embodiments of the passenger accommodation assembly are also described and shown in FIGS. 3-12.

As shown in FIG. 1A, the passenger accommodation assembly 10 comprises multiple accommodation units. In this embodiment, the accommodation assembly 10 comprises an upper accommodation unit 11 and a lower accommodation unit 12. Each accommodation unit has common elements such as a seat portion 14 and a foldable leg rest portion 13. In this embodiment, the upper accommodation unit 11 includes a backrest 15U, a privacy screen 18U and a leg platform 16 and the lower accommodation unit 12 includes a backrest 15L, a privacy screen 18L and a leg rest surface 19.

A plurality of accommodation units are shown as a collection of individual accommodation units represented by 1a, 1b, 1c, 1d, 1e, and 1f; each of the individual units being for a single passenger. Units 1b, 1d and 1f are at a second, lower elevation magnitude relative to the floor of the aircraft. Units 1a, 1c and 1e are at a first, upper elevation magnitude relative to the floor of the aircraft. In one embodiment of the invention, units 1b, 1d and 1f are at an elevation similar to the conventional height of an aircraft seat.

In the embodiment shown in FIG. 1A, every other seat, 1a, 1c, and 1e, is at an upper elevation and proximal to a seat at lower elevation allowing the horizontal space 2a, 2b and 2c under the seat portion 14, at height 3a, 3b and 3c, to be used as leg room for the passenger behind that unit. At the same time, horizontal distance 2a, 2b and 2c serves as reclining space for passenger in the upper accommodation units. Thus, the passenger in seat of lower height in unit 1b is fully reclined using leg room area 2a with height 3a while passenger in upper seat 1a can use horizontal distance 2a to fully recline.

Passenger in elevated seat 1c is shown in fully reclined position with backrest over distance 2b.

In unit 1d and 1f the passenger sits upright with the backrest 15L in an upright position and with the leg rest 13 in a fully collapsed and stowed position. Dotted line 13a shows the direction of deployment of the leg rest portion 13. Accommodation unit 1b is shown converted into a fully reclined, or bed position with the passenger fully reclined. 13d illustrates the leg rest portion 13 unfolded to serve as a portion of the unit converted into a recumbent, or bed position. Backrest 15L of the lower accommodation unit cannot recline back into the space of upper unit beyond the fixed separating, privacy screen 18L. Should the passenger on the lower unit wish to partially recline backrest 15L this can be done by using a sliding means to slide seat portion 12 and the leg rest portion 13 forward (shown by arrow 12 in unit 1d) pulling backrest 15L with it into a reclining angle. The deployed leg rest portion 13d of lower passenger can connect with or rest upon the leg rest surface 16 creating an extended leg rest portion (13d and 16) extending under the seat portion 14 or other portions of the upper unit such as the backrest 15U. It is understood and contemplated that the leg rest portion 13 alone can extend long enough to provide sufficient support for a passenger's legs in the second accommodation unit while in a reclined position. It is also understood that the sliding means can allow the seat, backrest and leg rest portions of the second accommodation unit alone, without the need for a leg rest surface, to provide sufficient length and support for a fully reclined passenger in the second unit. Suitable sliding means includes, but is not limited to ball bearings, wheels, protrusions or slides cooperating with tracks, rails, recesses, slides or other elements that independently or cooperatingly allow the seat and backrest to slide forward while maintaining the seat portion at generally the same horizontal elevation.

Panel 18U in upper unit 1c serves as a privacy screen between the passenger in accommodation unit 1c and the passenger unit behind it, 1d. Similarly, panel 18L in lower unit 1d is privacy screen between units 1d and 1e.

Each of the units 1a, 1b, 1c, 1d, 1e and 1f makes use of horizontal distance 2a, 2b and 2c of one unit over or under another unit in alternating fashion. Vertical distance 3a, 3b and 3c allows sufficient space for legs of passenger on the lower unit enabling horizontal overlap with reclining of upper unit passenger over distance 2a, 2b or 2c. For example accommodation unit 1b is in deployed horizontally in a bed position. A portion of the leg rest portion 2a overlaps with and is positioned underneath the seat portion of 1a which can recline over horizontal distance 2a thus both benefiting from distance 2a.

FIG. 1B illustrates a rear side view of the embodiment shown in FIG. 1A showing leg rest portion 13 partially deployed through hinges 5. FIG. 1B also shows structural panels 6 holding elevated seats and a luggage space 8 where lower passengers can store luggage under leg rest surface 19. FIG. 1B also shows the first accommodation unit elevation 4a and the second accommodation unit elevation 4b relative to the vehicle floor 4c.

FIG. 2 shows additional components of one embodiment of the invention. Access to the elevated accommodation unit is provided through step 21 leading to platform 22. In this embodiment of the accommodation unit assembly 10 there is sufficient space, represented by arrow 23, between units in order to have a recessed portion of the platform 22 to form step 21. In other words, distance 24 is needed for a foot rest area while distance 25 is required for a step 21 area. The step 21 is positioned on the front edge of the platform 22 surface and faces the aisle. The front edge of the platform is on the edge furthest from the upper unit seat portion and is opposite a back edge of the surface. The step 21 has a surface that is recessed and at a different elevation than the surface of the platform 22.

Another embodiment of the invention, applied to higher passenger density seating, will later show a solution to providing access to elevated seat when distance 23 is not sufficient for both foot rest area distance 24, and steps distance 25. Thus in embodiments where distance 23 is shorter and there is insufficient space for both a foot rest area and a step for passenger to reach to platform 22 of the elevated seat the present invention will later show a solution through a different arrangement of the step.

Figure 2B:
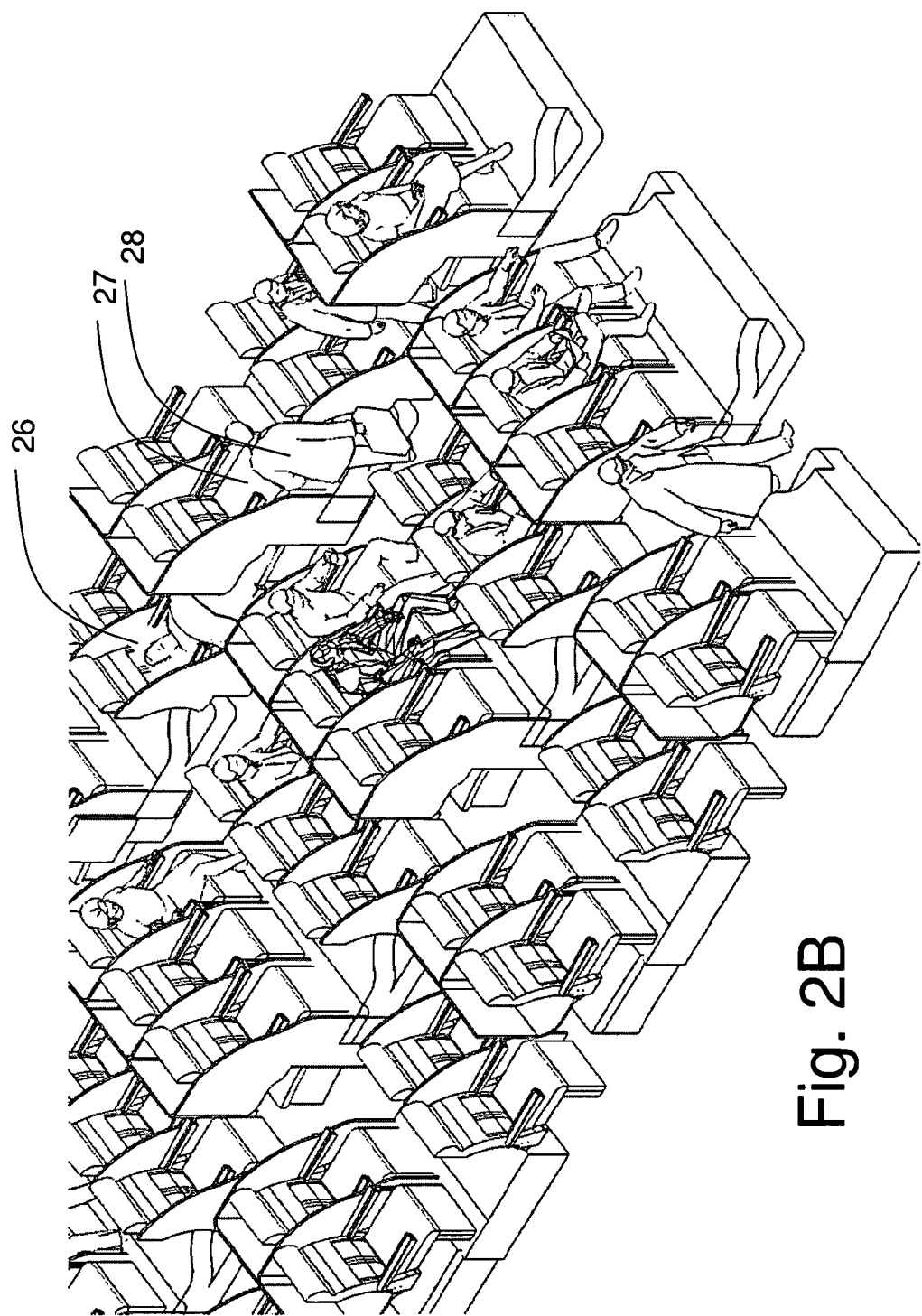
FIG. 2B is a perspective side-front view of multiple rows of accommodation unit assemblies in an airplane according to one embodiment of the invention capable of full reclining.

Combinations of Passenger Accommodation Assembly Embodiments:

FIG. 2B represents one embodiment of the present invention applied to the interior of an aircraft. This embodiment shows a twin isle aircraft with a seating pattern of 2-3-2 passengers abreast. Passenger 26 at lower level seat is in fully reclined position with legs extended under upper level seat 27. Passenger 28 is shown stepping onto platform for seat 27. The present invention using vertical space to improve comfort and/or passenger density applies to a variety of other combinations for twin isle, single isle or any other type of seating arrangement.

FIG. 3A represents one embodiment of the present invention applied to the interior of an aircraft. In this specific illustrative embodiment, there is limited height available such as may exist in the upper deck of a Boeing 747. On the left side of the aisle 31 are modules similar to those disclosed in U.S. Pat. No. 7,077,360 which is herein incorporated by reference in its entirety. On the other side of the aisle is one embodiment of a plurality of accommodation units of the present invention. In this embodiment of the present invention, the accommodation unit illustrated in FIGS. 1A, 1B and 2 are represented by the accommodation units on the right side of the aisle 31. On the left side of this configuration there is an upper bed accommodation unit illustrated by arrow 32 above a lower bed accommodation unit illustrated by arrow 33. Unit 32 is elevated to an elevation about shoulder height and lateral to a passenger sitting in unit 35. This arrangement makes optimal use of the vertical space when the required length for the beds is approximately 2 meters. The width of the upper deck of a Boeing 747 in approximately 4 meters wide allowing only one module of a 2-tiered accommodation assembly with accommodation units, or beds with recumbent positions generally perpendicular to the direction a passenger sits in the seat portion of the unit. In other words, there is no space for an additional pair of bed units on the right side having the same configuration as the left side of the isle 31. Thus the alternate elevated seat configuration of the accommodation assembly of the present invention configured for the right side provides an optimal use of that space.

For further clarity, FIG. 3B shows passengers in bed accommodation units 32 and 33 in reclined positions. On the other side of the isle 31 are a lower and an upper seat of the present invention as in FIG. 3A.

Figure 4:
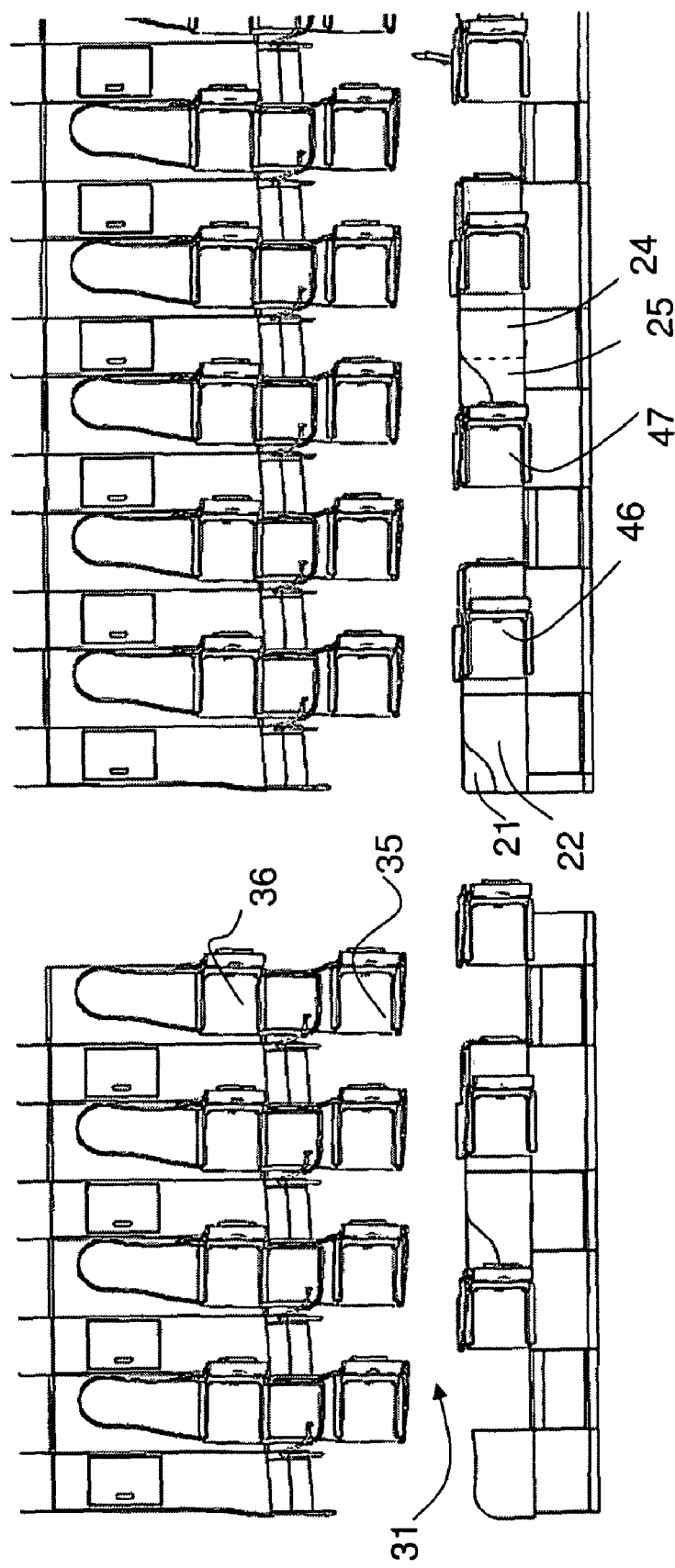
FIG. 4 is a plan view of multiple accommodation unit assemblies in an airplane according to one embodiment of the invention that includes bed accommodation units.

FIG. 4 illustrates an overhead plan view of the embodiments shown in FIG. 3A and FIG. 3B. This illustration shows step 21 and platform 22 provided to enable the passengers assigned to the upper units to step up to the unit and have sufficient foot and leg support when in an upright seated position. On one side of the aisle 31 is one embodiment of accommodation units of the present invention with seat 46 shown at an elevated level accessed through step 21 to platform 22. Behind seat 46 is seat 47 at a lower, conventional seat height. On the other side of the aisle 31 are bed accommodation units with bed unit 35 at a lower, conventional elevation and another laterally positioned bed unit 36 at an upper, shoulder height level.

Figure 5:
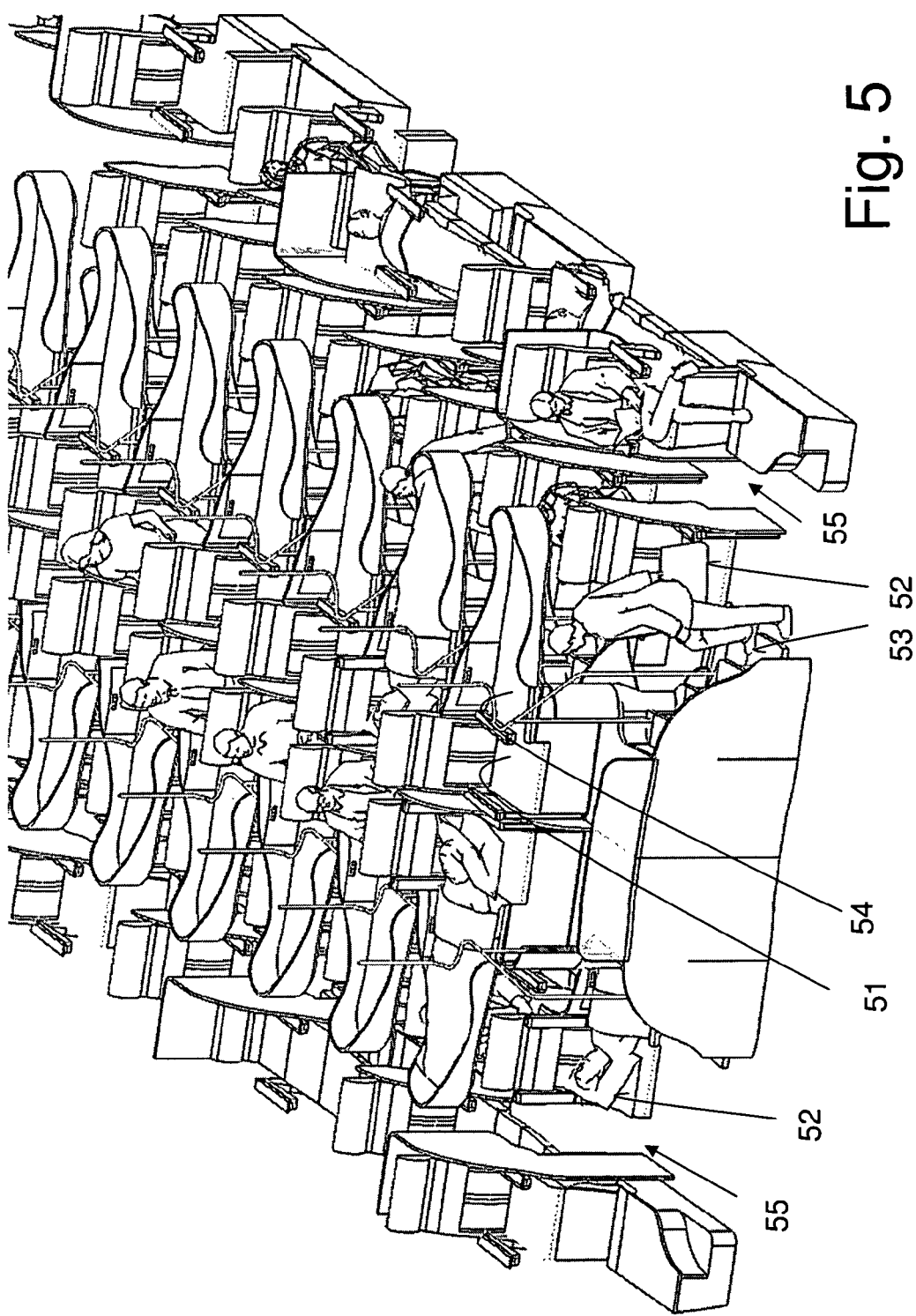
FIG. 5 is a perspective view of multiple accommodation unit assemblies in an airplane according to one embodiment of the invention that include bed accommodation units and multiple accommodation units along multiple aisles.

FIG. 5 shows another combination of accommodation units similar to those disclosed in U.S. Pat. No. 7,077,360 with one embodiment of the passenger accommodation assembly of the present invention in the two window seat areas. The passenger accommodation units in an alternate elevated configuration are the window seats next to the aisles 55 and the units between the aisles 55 are an embodiment of the accommodation assemblies similar to those disclosed in U.S. Pat. No. 7,077,360. This embodiment is suited for large aircraft with sufficient height in the middle (crown) area where the upper bed unit with seat portion 51 and laterally extending bed portion 54 is on an upper level fully above a passenger in the second, lower level seat portion 52. As is typical in these embodiments, the upper level unit with seat 51 and bed 54 is accessed through one or more steps 53. This arrangement is optimal when the requirement for the length of the beds is approximately 2 meters. For large body aircraft, approximately 6 meters wide, there is space for only two units of a 2 meter unit placed generally perpendicular on the longitudinal axis of the aircraft. A third unit would occupy the entire space leaving no room for aisles. In this arrangement the alternate elevated configuration of the accommodation units makes efficient use of the remaining space as shown in FIG. 5 along the windows of the aircraft.

Figure 6:
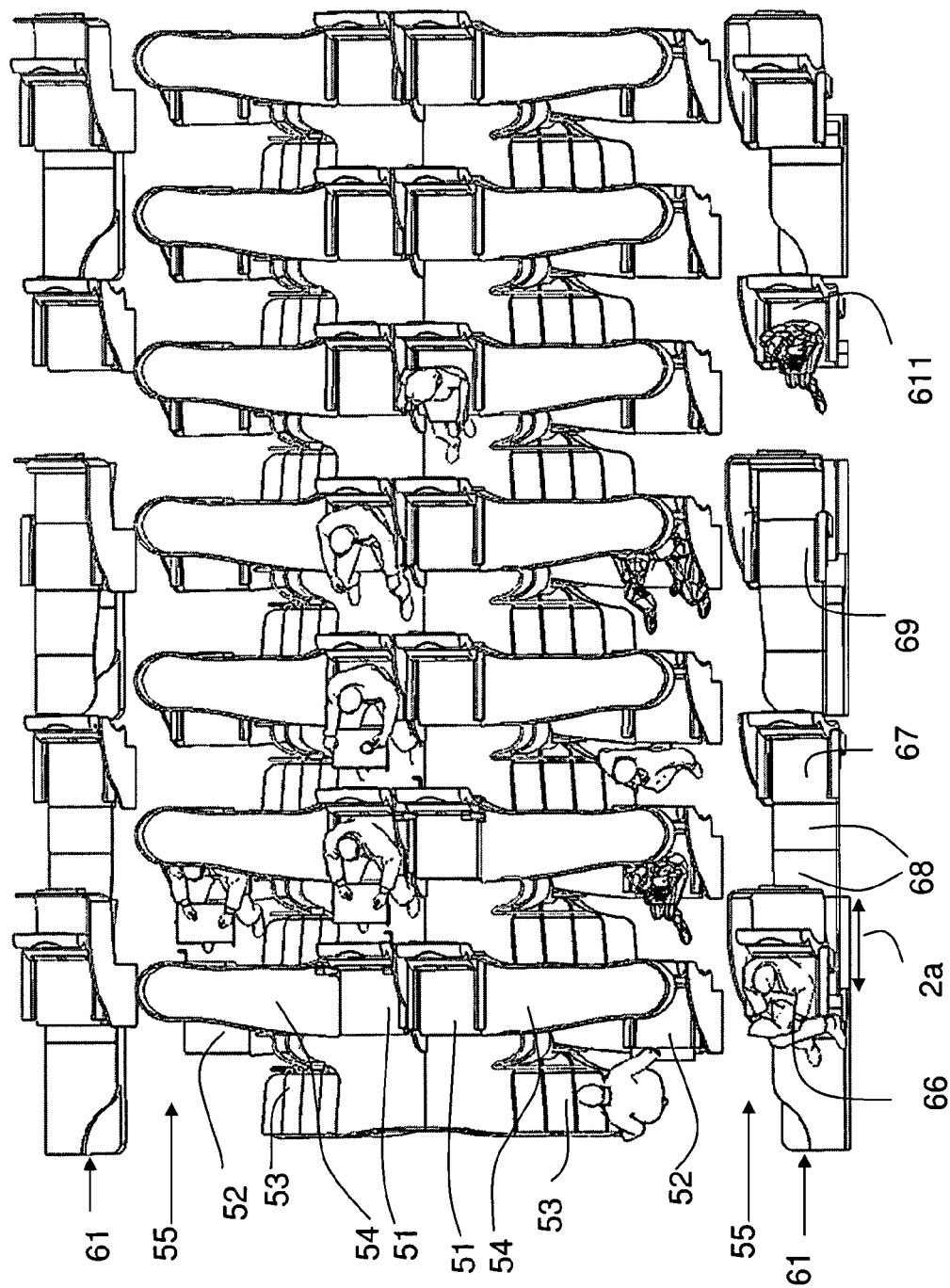
FIG. 6 is a plan view of multiple accommodation unit assemblies in an airplane according to one embodiment of the invention that include bed accommodation units and multiple accommodation units along multiple aisles.

FIG. 6 is a top plan view of FIG. 5 showing the accommodation units in an alternate elevated configuration along the exterior areas 61 of the aircraft aligned along the aisles 55, combined with multiple pairs of bed units. The accommodation units along the exterior areas 61 start with an upper accommodation unit, such as seat 66, followed by a lower accommodation unit of conventional height, such as seat 67. Each pair of bed units in the middle section has an upper bed unit with seat portion 51 extending into bed portion 54, and steps 53 and having a lower bed unit with seat portion 52 and a bed portion.

FIG. 6 also illustrates the accommodation unit with seat 67 and the leg rest portion 68 deployed—leg rest portion is extended over length under elevated level seat 66 creating a unit that allows the passenger in seat 67 to fully recline. In this embodiment, seat 67 is followed by upper accommodation unit having a seat 69 and a leg rest portion deployed followed by another lower unit with seat 611 and the leg rest folded.

In standard fashion for conventional passenger aircraft, or other transportation vehicle seatbelts or other restraints may be provided, as appropriate or required. Likewise, serving trays may be located for movement by a passenger into and out of position at appropriate times during vehicle operation. Embodiments in Constricted Transportation Vehicle Environments:

Thus far the description has illustrated embodiments of the present invention that utilize the vertical space in aircraft environments representative of what is currently considered Business Class or First Class. In both class environments there is sufficient space 23 between seats to fit steps 21, over distance 25 as shown in FIG. 2 and FIG. 4, together with distance 24 for passenger's foot rest in an upright seated position. The embodiments presented above show the provision of fully horizontal reclining, or recumbent accommodations taking advantage of vertical space to improve passenger density and comfort.

Another embodiment of the present invention will show its application to improving the comfort in conventional economy class where there is little space for steps in front of the leg room area of a typical accommodation unit.

Figure 7A:
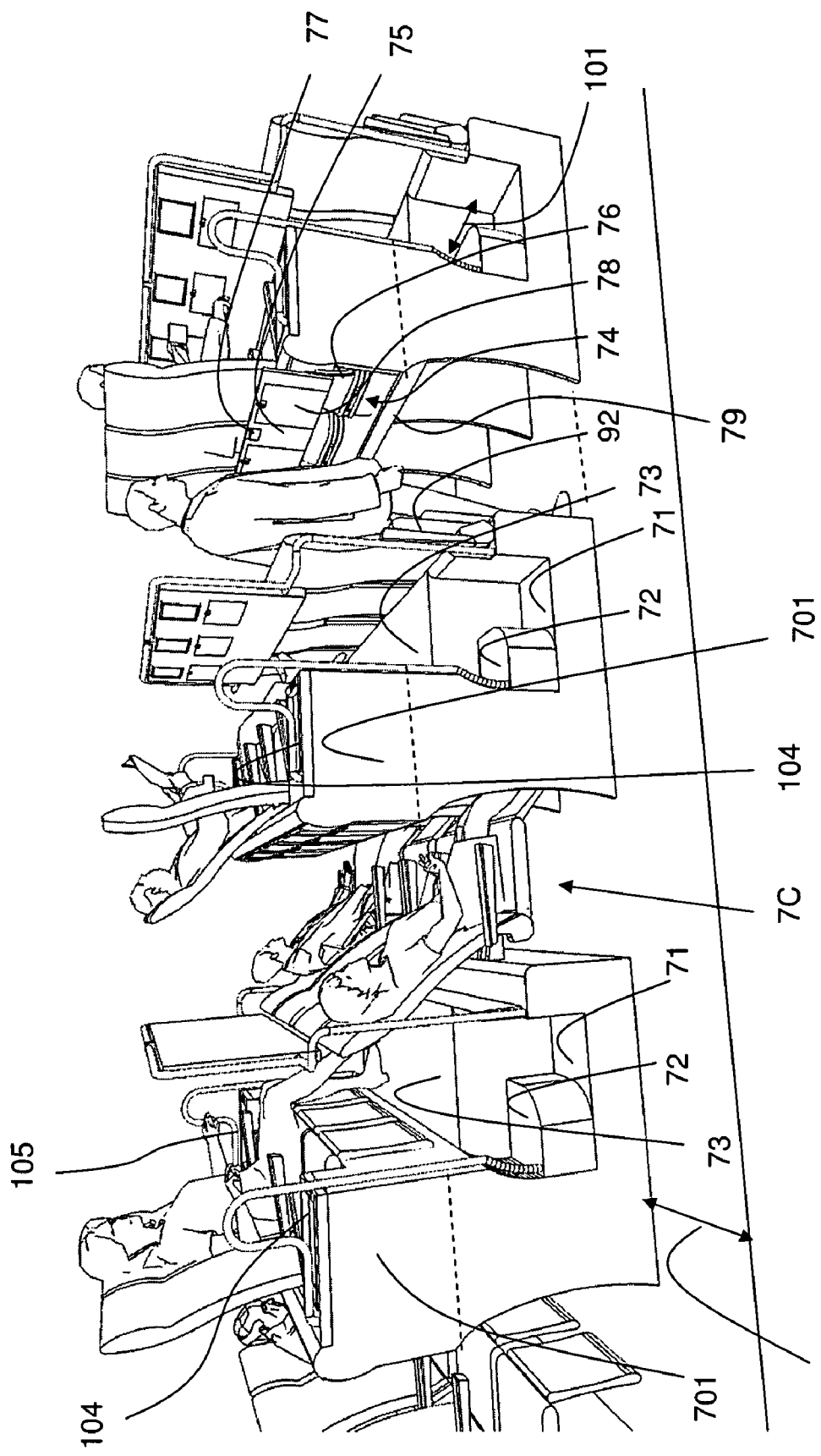
FIG. 7A is a side-perspective view of multiple accommodation unit assemblies in an airplane according to one embodiment of the invention used in higher passenger density environments.
Figure 8:
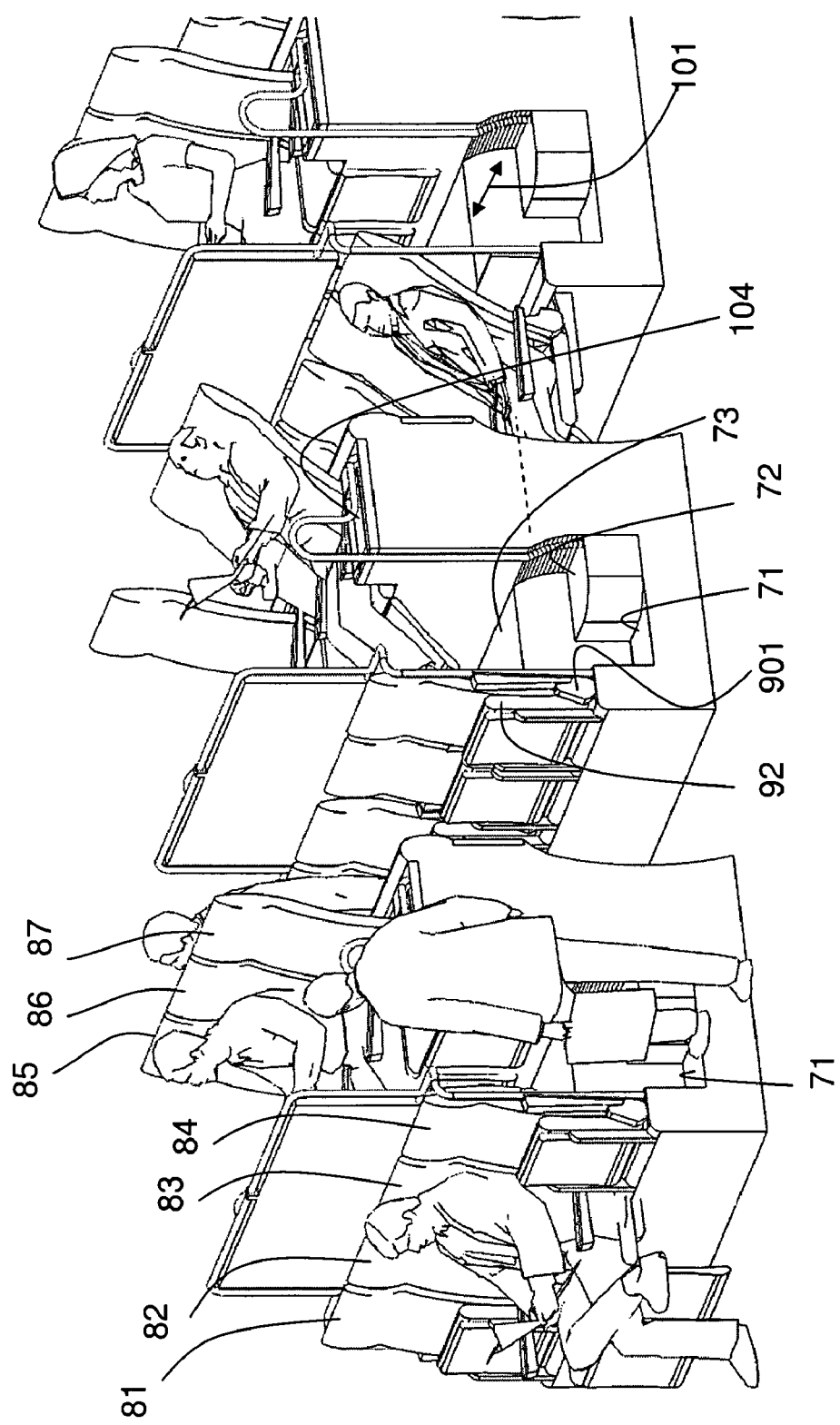
FIG. 8 is a side-perspective of multiple accommodation unit assemblies in an airplane according to one embodiment of the invention used in higher passenger density environments.

FIG. 7A illustrates one embodiment of the passenger accommodation assembly adapted to economy class. This assembly and its arrangement provides partial reclining, though the same principle can be adapted for fully reclining positions if there is sufficient space between the seats in tandem (pitch) as shown in the previous embodiments. FIG. 7A shows one embodiment in a middle section between the two aisles of a large, twin-aisle aircraft. Aisle 70 provides access to the seating accommodation area. In this embodiment, it is illustrated with rows of 4 lower accommodation units in the middle section however other numbers of units per row, such as 3 or 5, are contemplated depending on the size of the vehicle. FIG. 7A shows rows of four lower units at conventional height, such as row 7c, followed by three upper units behind it which in turn are followed by rows of four units at the lower conventional height. This embodiment is also illustrated in FIG. 8 where seats 81, 82, 83 and 84 are at conventional level followed by seats 85, 86 and 87, at an upper level which in turn are followed by four seats at the lower conventional level. The purpose of elevating only three seats instead of four is to leave space for the addition of steps 71 and 72, at a width shown by arrow 101, on both sides of upper units. The steps 71 and 72 face the aisles along the upper units and allow passengers to step up and safely access the platform 73. The reduction from four seats to three seats (for the row of upper seats) leaves a space 104 along the side of the two isle seat seats. This space can be used for an armrest or other surface. This space, or armrest portion, is shown as working surfaces 104 and 105 in plan view in FIG. 10. Passengers can make use of these working surfaces for placing personal items.

Returning to FIG. 7A, to further describe the steps 71 and 72 in given that there is limited space available for the depth of the steps, as represented by arrow 101, the following arrangement presents a solution by using a steps that occupies only the half side of the step on which the foot lands. Looking at FIG. 7A when stepping up to the platform 73, a passenger will most naturally step first with the right foot on step 71 which is the lowest, then with the left foot on the second step 72 which is the next step and finally on the third and last step with the right foot onto the platform 73. The space under the platform 73 and the steps 71 and 72 is hollow and accessible by a passenger behind the platform. By positioning the steps such that the lowest steps are on the front edge of the platform, the edge furthest from the upper unit seat, the passenger behind that seat is given more room for their feet and legs to extend into the hollow portion of the platform. As the embodiment in FIG. 7A shows steps on the right side of the accommodation unit, steps on the other side of the units can be arranged to provide the same features. As shown in FIG. 8, the steps on the other aisle may be designed to have the first step 71 on the left side, and the second step 72 on the right; a passenger is shown stepping first with the left foot on step 71 and continues in the manner explained. Other arrangements of the steps are contemplated however this arrangement provides a good balance of comfort safety and economy related to the limited space available for the depth of each step.

Figure 7B:
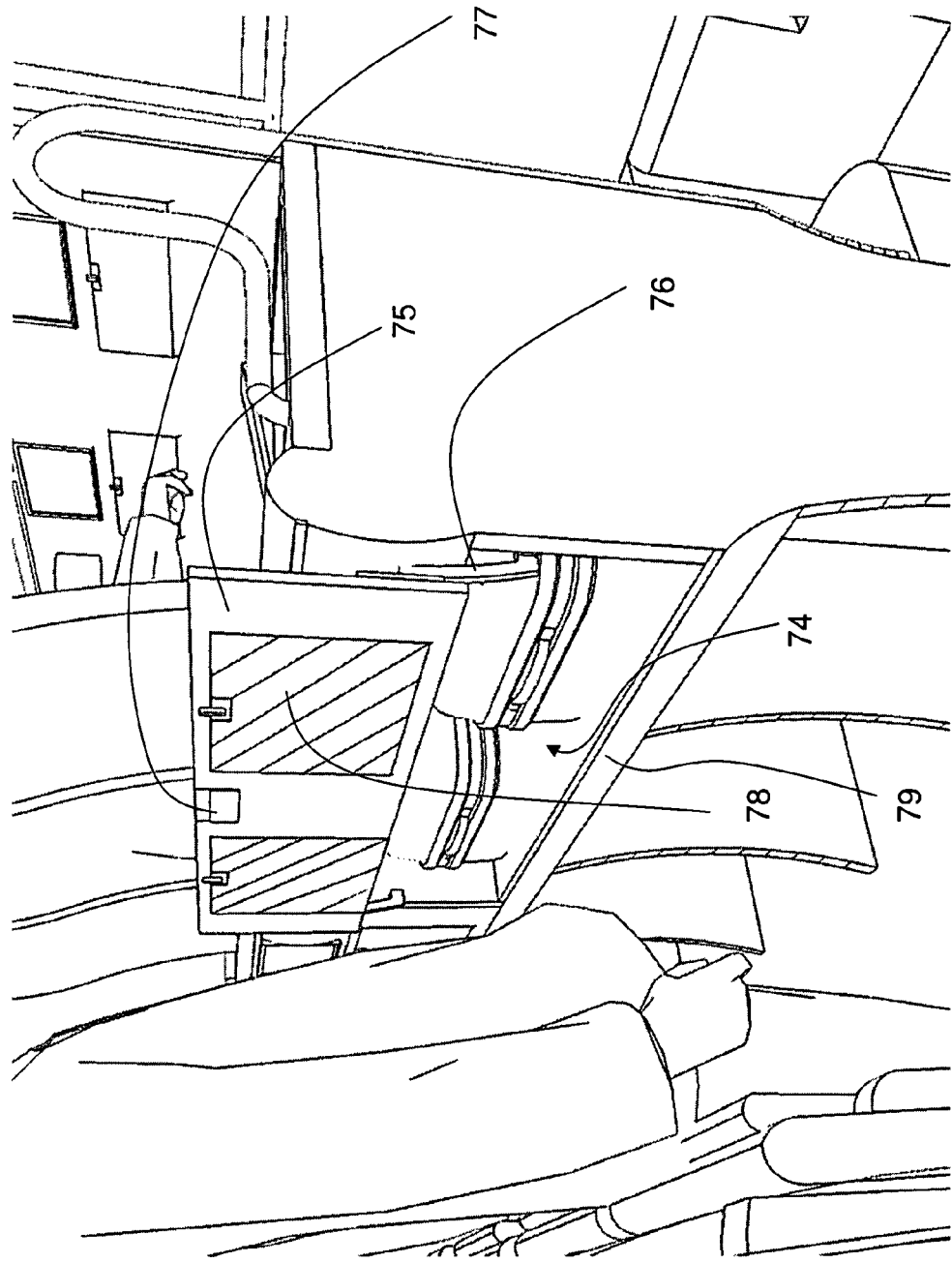
FIG. 7B is a side-perspective view of one embodiment of the invention used in higher passenger density environments showing an open storage compartment.

FIG. 7A shows luggage in the storage compartment 74 area below the upper seat and a bottom portion 79 of the upper unit. Door 75 of the storage compartment opens mostly vertically through an opening arm 76. A passenger opens storage compartment door 75 by lifting handle 77. FIG. 7B is a detailed view of storage compartment described with arm 76 providing a planar opening means to open the luggage door 75. The planar opening means provides a way to open the luggage door 75 while minimally interfering on the space of the passenger in the lower accommodation unit. Suitable planar opening means include but are not limited to flat panel doors sliding laterally or vertically, arms, hinges, tracks or any other means to allow the doors to open with minimal space being used from the passenger in the lower unit.

Figure 7C:
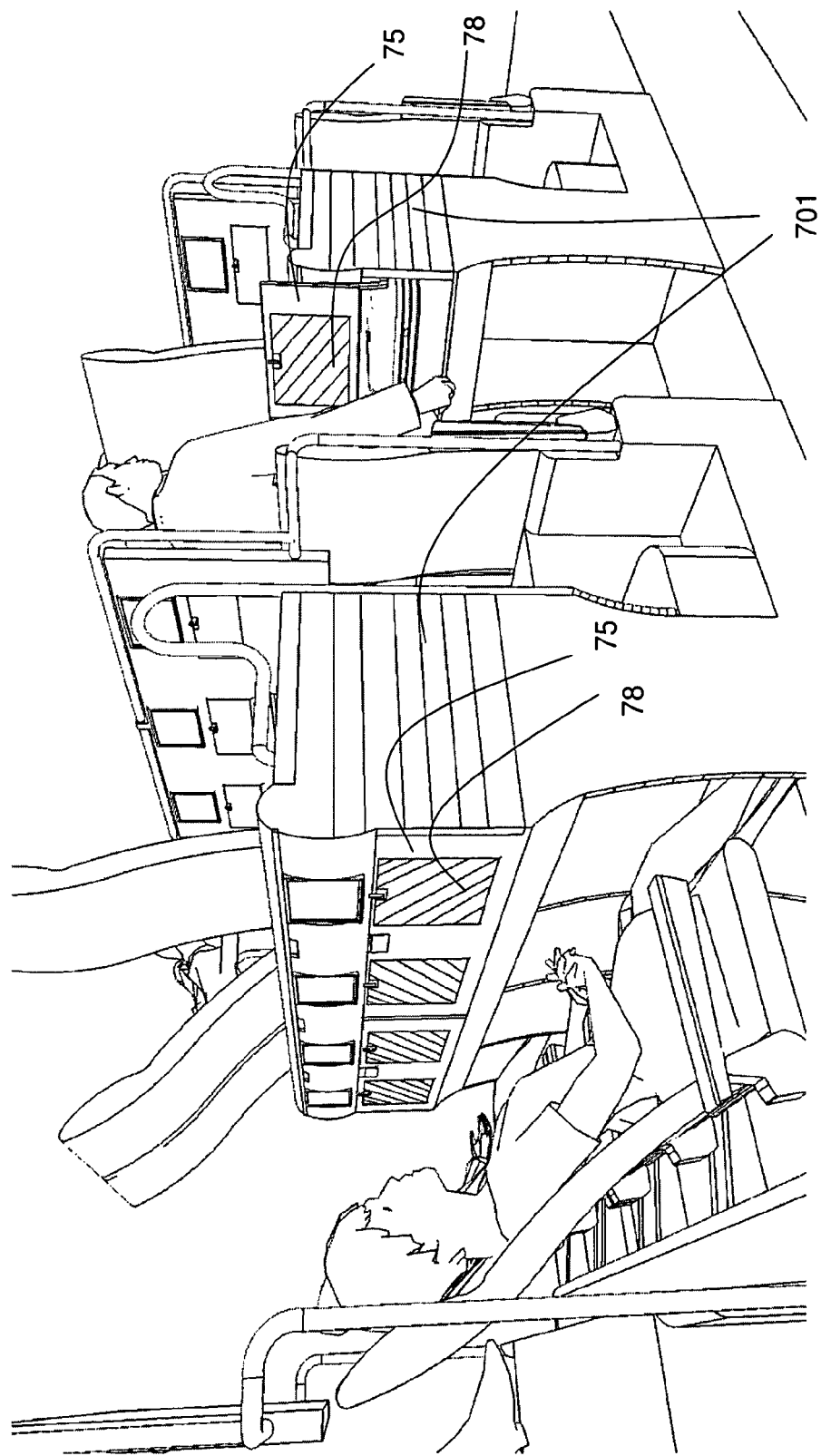
FIG. 7C is a side-perspective view of one embodiment of the invention used in higher passenger density environments showing a storage compartment covered by a door.

FIG. 7C shows one door 75 closed and one door opened. Food trays 78 can be placed on the exterior of the storage compartment door 75. The door 75 is placed in the area behind upper seats rather than laterally towards the isle on surface 701, in order to avoid the need for passengers to block the aisles while storing or removing their luggage. The space under surfaces 104 and 105 is part of the storage compartment accessed from behind the upper units.

Figure 9:
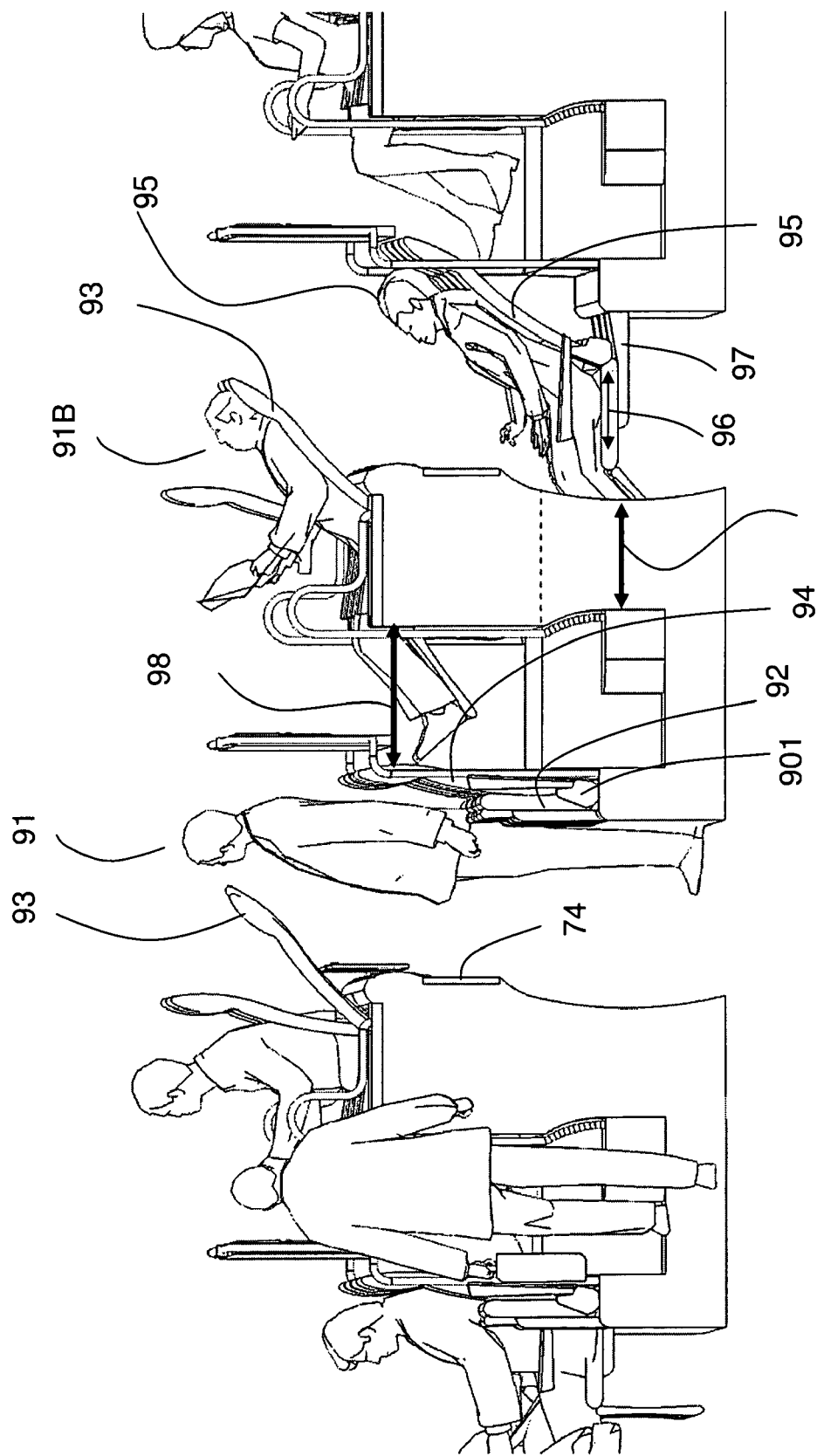
FIG. 9 is a side view of multiple accommodation unit assemblies in an airplane according to one embodiment of the invention used in higher passenger density environments.
Figure 10:
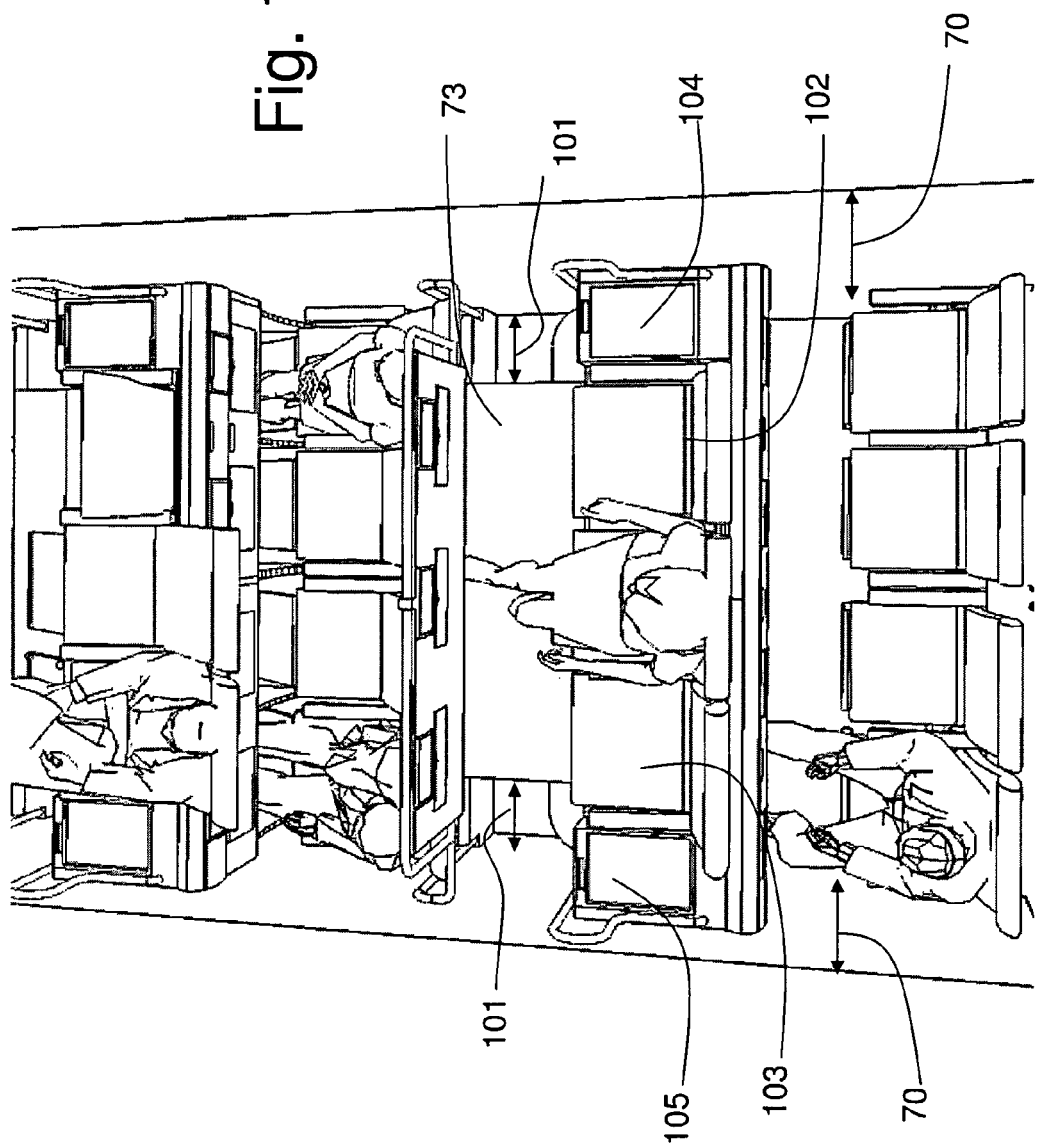
FIG. 10 is a is a top-rear view of multiple accommodation unit assemblies in an airplane according to one embodiment of the invention used in higher passenger density environments.

Turning to FIG. 9 passenger 91 is seen standing behind a reclined upper backrest 93. Seat portion 92 behind passenger 91 is folded into vertical position in order to allow space for passenger to stand while upper backrest 93 is in a reclined position. The vertical folding feature of seat 92 allows more comfortable access to storage compartment 74. Providing mobility of seat 92 into vertical position allows passenger 91 to access seats while the passenger seat 93 on the upper level is extensively reclined. The folding feature of seat 92 can be seen also in FIG. 7A providing sufficient space for passenger to access the storage area below upper seat.

As shown in FIG. 9, the vertical folding means is provided by a hinge 901 or other similar device that enables the lower seat portion and the leg rest portion of the lower seat to move into a generally vertical position. Suitable folding means includes but is not limited to hinges, clips, tracks or any combination of these elements that allow the seat to move into a generally vertical position.

Also as shown in FIG. 9, the backrest 93 of the upper unit has extensive space to recline into the space behind it—enabled by the fact that there is no passenger sitting directly behind backrest 93, as in conventional economy seats, but rather below the backrest 93 as seen in sitting position of passenger 95. On the other hand, the backrest 94 of the lower seat has limited reclining space into the area behind it which forms the legroom area 98 of an upper passenger as seen with passenger 91B. To compensate for this limitation the lower unit uses the space 99 in front of it, as seen with passenger 95 shown with legs extended into legroom area 99 below the bottom portion of the upper unit. In order to recline the backrest 95 the passenger slides the seat 96 forward utilizing the sliding means, such as rails 97, thus bringing the backrest into reclined position 95. Passenger 91B on the upper level has abundant reclining space but less legroom (than lower passenger 95). By reclining the upper unit backrest 93 into the area behind it and by sliding the lower seat 96 into the area in front of it both the upper and lower units will have comparable reclining positions and comfort as can be seen by the overall seating position of passengers 95 and 91B.

Although rails 97 are utilized in this embodiment, other means of allowing the seat to slide forward may be utilized as described earlier in this description.

Figure 11:
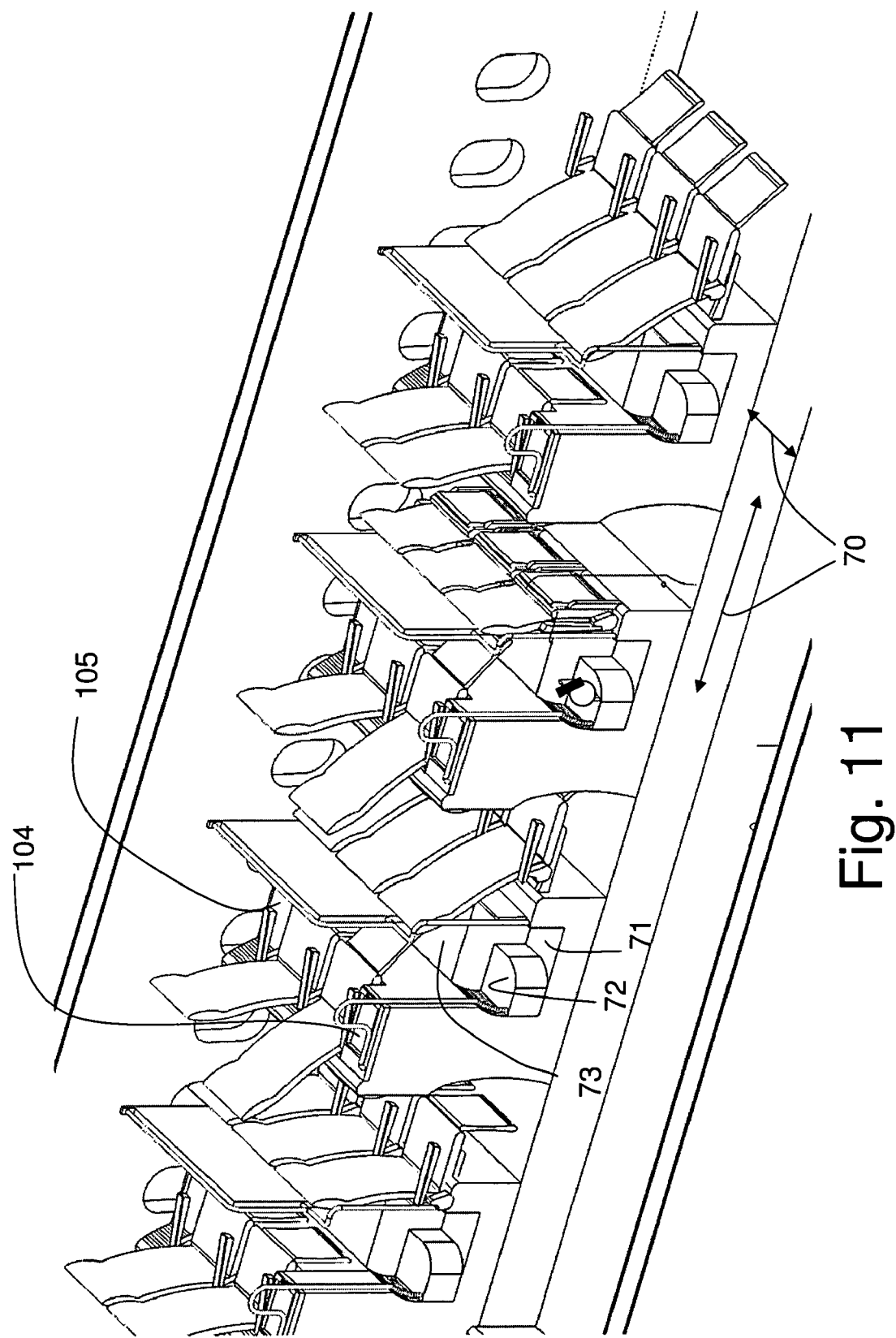
FIG. 11 is a perspective view of one embodiment the present invention with accommodation units in the area between the aisles and the windows of an aircraft.

Combinations of Embodiments in Constricted Transportation Vehicle Environments:

FIG. 11 illustrates another embodiment of the present invention utilizing the multiple alternate elevated accommodation units shown in FIGS. 7-10 positioned in the area between an aisle 70 and the window portion of a large aircraft. This arrangement is an example of rows of three seats with every other row elevated and reduced to two seats to allow room for steps 71 and 72 leading to platform 73 for access to upper seats. Working surface areas 104 and 105 are also shown.

Figure 12:
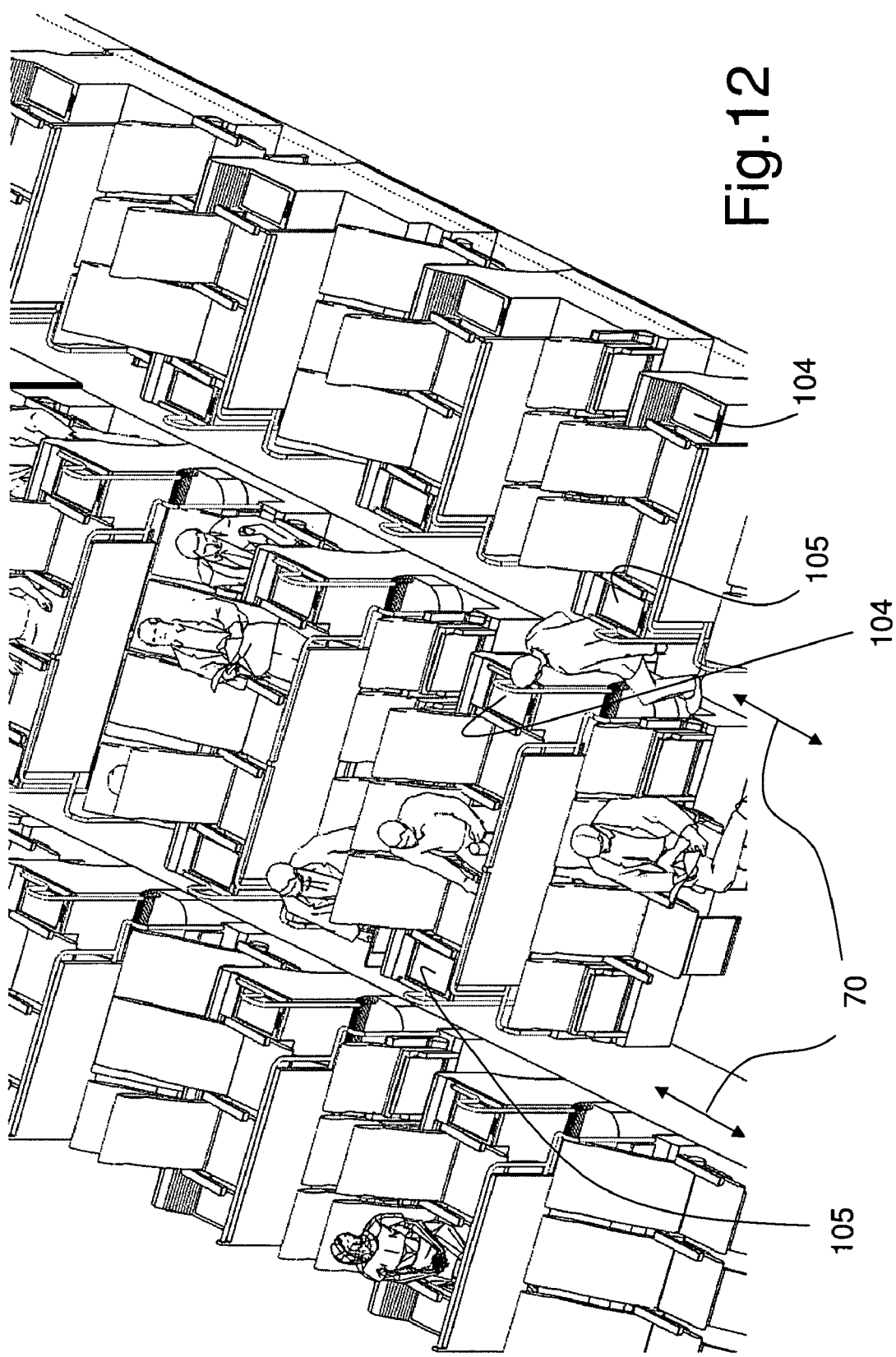
FIG. 12 is a perspective view of one embodiment of the present invention illustrating accommodation units in a twin-aisle aircraft.

FIG. 12 shows a top perspective view illustrating an embodiment with the accommodation assemblies illustrated in FIG. 11 combined with the accommodation assemblies illustrated in FIGS. 7-10. Working surfaces 105 and 104 are the lateral fixed trays for passenger use on the side/isle seats of the upper units to place personal objects. These working surfaces were also shown in FIGS. 7, 8, 10 and 11 for seating in the middle area between the twin aisles 70 of the aircraft.

One of ordinary skill in the art of the present invention will also appreciate that there can be left and right configurations of the offsets and accommodation units to fit a particular installation location. Additional configurations are possible, including but not limited to the provision of the illustrated arrangement in a two aisle configuration with a mirror image configuration of interior accommodation units and window accommodation units, and the like.

In addition, while the passenger accommodation units of the present invention are described as being arranged along the longitudinal direction of the aircraft and transverse to the main aisle, it should be understood that the units of the present invention could be used in conjunction with an entrance aisle that runs in other directions with respect to the fuselage depending on the configuration of the specific aircraft or vehicle into which they are being built.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved.

What is claimed is:

1. A passenger accommodation assembly for a transportation vehicle, comprising:
    a plurality of accommodation units placed along an aisle, each accommodation unit of the plurality of accommodation units being convertible between an upright seat position and a reclined position and having a backrest portion, a seat portion, and a leg rest portion attached to the seat portion;
    wherein a seat portion of a first accommodation unit of the plurality of accommodation units is disposed at a first elevation magnitude relative to a floor of the transportation vehicle and a seat portion of a second accommodation unit of the plurality of accommodation units is disposed at a second elevation magnitude relative to the floor of the transportation vehicle that is less than the first elevation magnitude;
    a leg rest surface directly beneath the seat portion of the first accommodation unit and at about the same elevation as the seat portion of the second elevation unit wherein the leg rest portion of the second accommodation unit cooperates with the leg rest surface forming an extended leg rest portion under the seat portion of the first accommodation unit when the second accommodation unit is in the reclined position; and
    wherein the extended leg rest portion of the second accommodation unit extends under the seat portion of the first accommodation unit when the second accommodation unit is in the reclined position.

2. The passenger accommodation assembly for a transportation vehicle of claim 1 wherein:
    the first accommodation unit further comprises a platform portion having a platform surface, a surface front edge being furthest from the seat portion of the first accommodation unit, a surface back edge being closest to the seat portion of the first accommodation unit and a platform surface elevation magnitude from the floor of the transportation vehicle;

the platform portion further comprising a recessed platform portion forming a step portion comprising a step surface and a step surface elevation magnitude from the floor of the transportation vehicle;

the step surface elevation magnitude is less than the platform surface elevation magnitude; and the step surface being aligned with the surface front edge and located on a side of the platform surface accessible by the aisle whereby the step surface can be used as a step by a passenger in the aisle.

3. The passenger accommodation assembly for a transportation vehicle of claim 1 wherein the second accommodation unit further comprises a sliding means whereby the seat portion, the backrest portion and the leg rest portion of the second accommodation is convertible between an upright seat position and a reclined position.

4. The passenger accommodation assembly for a transportation vehicle of claim 1 further comprising:

a screen separating the first accommodation unit from the second accommodation unit; and wherein a passenger in each of the plurality of accommodation units faces in a same direction when the accommodation unit is in the upright seat position as when the accommodation unit is in the reclined position.

5. The passenger accommodation assembly for a transportation vehicle of claim 1 further comprising:

a plurality of bed accommodation units placed along the aisle, each bed accommodation unit of the plurality of bed accommodation units comprising a bed backrest portion, a bed seat portion and a bed portion, the bed portion including a substantially flat surface adapted to accommodate a passenger in the recumbent position;

wherein a pair of bed accommodation units of the plurality of bed accommodation units maintain a bed portion having a length that extends perpendicular to the direction the passenger faces when seated in the bed seat portion;

the pair of bed accommodation units comprising a first bed accommodation unit and a second bed accommodation unit;

wherein a bed seat portion and a bed portion of the first bed accommodation unit of the plurality of bed accommodation units is disposed at a first bed elevation magnitude relative to a floor of the transportation vehicle and a bed seat portion and a bed portion of the second bed accommodation unit of the plurality of bed accommodation units is disposed at a second bed elevation magnitude relative to the floor of the transportation vehicle that is less than the first bed elevation magnitude; and wherein a bed portion of the second bed accommodation unit extends under the bed seat portion and the bed portion of the first accommodation unit.

6. The passenger accommodation assembly for a transportation vehicle of claim 5 further comprising a second plurality of accommodation units placed in series along a second aisle along the plurality of bed accommodation units.

7. A method for accommodating passengers in a transportation vehicle comprising the steps of:

providing a plurality of accommodation units placed along an aisle, each accommodation unit of the plurality of accommodation units being convertible between an upright seat position and a reclined position and having a backrest portion, a seat portion, and a leg rest portion attached to the seat portion;

providing and locating the plurality of accommodation units whereby a seat portion of a first accommodation unit of the plurality of accommodation units is disposed at a first elevation magnitude relative to a floor of the transportation vehicle and a seat portion of a second accommodation unit of the plurality of accommodation units is disposed at a second elevation magnitude relative to the floor of the transportation vehicle that is less than the first elevation magnitude;

providing a leg rest surface with the second accommodation unit directly beneath the seat portion of the first accommodation unit and at about the same elevation as the seat portion of the second elevation unit wherein the leg rest portion of the second accommodation unit cooperates with the leg rest surface and forms an extended leg rest portion under the seat portion of the first accommodation unit when the second accommodation unit is in the reclined position; and providing a platform portion with the first accommodation unit whereby a first passenger can access and utilize the first accommodation unit in the upright seat position and the reclined position and a second passenger can access and utilize the second accommodation unit in the upright seat position and the reclined position.

8. The method of claim 7 wherein the step of providing a platform portion further comprises:

providing a platform surface of the platform portion having a platform surface front edge furthest from the seat portion of the first accommodation unit and a platform surface back edge closest to the seat portion of the first accommodation unit and a platform surface elevation magnitude from the floor of the transportation vehicle;

the platform portion further comprising a recessed platform portion forming a step portion with a step surface and a step surface elevation magnitude from the floor of the transportation vehicle;

the step surface elevation magnitude being less than the platform surface elevation magnitude; and the step surface being aligned with the surface front edge and located on a side of the platform surface accessible by the aisle whereby the step surface can be used as a step by a passenger in the aisle.

* * * * *